(12) United States Patent
Balfour (10) Patent No.: US 7,057,612 B2
(45) Date of Patent: Jun. 6, 2006

(54) METHOD AND SYSTEM FOR A FOUR-DIMENSIONAL TEMPORAL VISUALIZATION DATA BROWSER

(75) Inventor: Robert E. Balfour, Bethpage, NY (US)

(73) Assignee: Balfour Technologies LLC, Bethpage, NY (US)

(*) Notice: Subject to any disclaimer, the term of this patent is extended or adjusted under 35 U.S.C. 154(b) by 513 days.

(21) Appl. No.: 09/758,817

(22) Filed: Jan. 11, 2001

(65) Prior Publication Data

US 2002/0147729 A1 Oct. 10, 2002

Related U.S. Application Data

(60) Provisional application No. 60/175,773, filed on Jan. 12, 2000.

(51) Int. Cl.
*G09G 5/00* (2006.01)

(52) U.S. Cl. .................................................. 345/419

(58) Field of Classification Search ................ 345/419, 345/848, 475, 742, 474, 427
See application file for complete search history.

(56) References Cited

U.S. PATENT DOCUMENTS

| | | | |
|---|---|---|---|
| 4,642,780 A | 2/1987 | Thomson | |
| 4,821,220 A | 4/1989 | Duisberg | |
| 5,268,998 A * | 12/1993 | Simpson | ..................... 345/427 |
| 5,440,730 A | 8/1995 | Elmasri et al. | |
| 5,515,490 A | 5/1996 | Buchanan et al. | |
| 5,524,187 A | 6/1996 | Feiner et al. | |
| 5,717,879 A | 2/1998 | Moran et al. | |
| 5,742,283 A | 4/1998 | Kim | |
| 5,877,758 A | 3/1999 | Seybold | |
| 5,889,951 A * | 3/1999 | Lombardi | ................... 709/219 |
| 5,907,320 A | 5/1999 | Beesley et al. | |
| 5,918,012 A | 6/1999 | Astiz et al. | |
| 6,023,703 A | 2/2000 | Hill | |
| 6,058,397 A | 5/2000 | Barrus et al. | ............ 707/101.1 |
| 6,144,375 A | 11/2000 | Jain et al. | ................ 715/500.1 |
| 6,169,817 B1 | 1/2001 | Parker et al. | |
| 6,188,396 B1 | 2/2001 | Boezeman et al. | ....... 715/500.1 |
| 6,201,996 B1 | 3/2001 | Crater et al. | ................... 700/9 |
| 6,204,840 B1 | 3/2001 | Petelycky et al. | ........ 715/500.1 |
| 6,256,623 B1 * | 7/2001 | Jones | ............................ 707/3 |
| 6,349,301 B1 * | 2/2002 | Mitchell et al. | ............ 707/101 |
| 6,448,979 B1 * | 9/2002 | Schena et al. | .............. 345/741 |

(Continued)

OTHER PUBLICATIONS

Si et al., A Temporal Framework for Unifying Meta-Data and Data Evolution, ACM 1998, pp. 203-210.*

(Continued)

*Primary Examiner*—Amr A. Awad
*Assistant Examiner*—Motilewa Good-Johnson
(74) *Attorney, Agent, or Firm*—Ostrolenk, Faber, Gerb & Soffen, LLP (57) ABSTRACT

A method and system for accessing data from information databanks in all four dimensions, providing the ability to interactively experience and naturally visualize the temporal progression of important data components, their attributes and most importantly their dynamically changing inter-relationships. The method and system builds 4D portals into information databanks, through which computer-generated 4D worlds are served to users in a 4D browser, which can be naturally experienced in both temporal and spatial context to derive knowledge from the dataset. This 4D browser-server-portal system provides access to information both temporally and spatially, wherein the progression of dynamic information over time can be visually analyzed and utilized on a wide range of industry and research applications.

39 Claims, 4 Drawing Sheets

U.S. PATENT DOCUMENTS 6,587,110 B1 * 7/2003 Kunimatsu et al. ......... 345/502

OTHER PUBLICATIONS

Barrus et al., Locales: Supporting Large Multiuser Virtual Environments, IEEE, 1996, pp. 50-57.*

Si et al., Modeling Video Objects in 4DIS Temporal Database System, ACM 1998, pp. 525-531.*

Si et al., 4DIS: A Temporal Frameowrk for Unfying Meta-Data and Data Evolution, ACM 1998, pp. 203-210.*

Luttermann et al., VRML History: Storing and Brwosing Temporal 3D-Worlds, ACM 1999, pp. 153-181.*

R. Edwards, B. Zeng and R. Balfour, A Case Study: 4D Modeling & Simulation for the Modernization of Logan International Airport, Transportation Research Board78th Annual Meeting, Jan. 10-14, 1999, p. 1-19.

R. Balfour and B. Andrews, 3-Dimensional Roadway Traffic Simulation and Modeling for Design, Public Education and Conflict Resolution: A New York Case Study, Transportation Research Board 78th Annual Meeting, Jan. 13, 1999, p. 1-8.

4D CAD Research Wish List for 4D Environments: a WDI R&D Project, found at http://www.stanford.edu/group/4D/issues/wishlist.shtm1, pp. 1-22 printed Mar. 29, 2001.

Bentley Schedule Simulator Software Description, Bentley Systems, Inc.

Intergraph Process & Building Solutions, SmartPlant Review, Apr. 2000.

W. Jepson and Scott Friedman, A Real-Time Visualization System for Large Scale Urban Environments, UCLA Urban Simulation Team.

The Apoala Project, An Integrated Approach For Representation and Analysis of Space/Time Environmental Data, Pennsylvania State University, 1998-1999.

VRWAREHOUSE Home Page, Welcome to the Visual World, found at www.vrwarehouse.com.

Advanced Visual Systems, The Open Viz Product Family Home Page.

COGNOS Home Page, Cognos Visualizer Guided Tour Brochure, 2000, found at www.cognos.com.

S. Hibino and E. Rundensteiner, MMVIS: A MultiMedia Visual Information Seeking Environment for Video Analysis, EECS Department, Software Systems Research Laboratory, The University of Michigan.

F. Bocchi, Conference Abstracts and Applications, Electronic Schoolhouse, The 4D Virtual Museum of the City of Bologna, Italy, pp. 8-11.

* cited by examiner

METHOD AND SYSTEM FOR A FOUR-DIMENSIONAL TEMPORAL VISUALIZATION DATA BROWSER

CROSS REFERENCE TO RELATED APPLICATIONS

This application is based upon and claims the benefit of U.S. Provisional Application No. 60/175,773, filed Jan. 12, 2000, the entire disclosure of which is incorporated herein by reference.

BACKGROUND OF THE INVENTION

1. Field of the Invention

The present invention relates to a system for creating and interacting with computer-generated visualizations of information databanks in all four dimensions of time and space. In particular, the invention relates to a system and method to transform information datasets into four-dimensional (3D space plus time, hereafter known as 4D) objects, and visually and temporally browse and analyze the complex, dynamic relationships between 4D objects and their attributes in the combined temporal-spatial domain.

2. Description of the Prior Art

In the field of computer graphics, computer-based 3D imaging systems are known. Computer graphics languages and application-programming interfaces exist that interactively display 3D-perspective drawings of visual scenes onto the 2D pixel matrix of computer monitors and other computer-interfaced image projection devices. The most widely used computer graphics language used to achieve this is OpenGL™, which can generate 3D interactive visual scenes using 3D-accelerated PC-based graphics cards or special purpose graphics machines such as Silicon Graphics(R) workstations. Users can interactively manipulate the spatial location and orientation of the perspective eyepoint via a user interface device such as a mouse, joystick or trackball, to effectively create the effect of flying thru the computer-generated 3D visual scene, as well as select and highlight various 3D objects in the visual scene.

Web browser based 3D imaging is also known. Worldwide-web browsers have been enabled with 3D graphics languages such as Virtual Reality Modeling Language (VRML) and Java3D™ that display platform-independent 3D images and scenes in a web browser.

In the field of computer-based database management systems, temporal data mining is also a known technique. Information databanks have become so huge and complex that data mining techniques have been developed using the SQL data query language to find and extract the desired information, which is presented to the user in a tabular text format, or possibly summarized in a chart or graph. Present day relational databases also support time fields, which enable data mining to be done for specific points in time. These database reports, charts and graphs fail to capture and readily present the nature of complex temporal data relationships. Analyzing data as snapshots-in-time also inherently excludes the complex dynamics of temporal data relationships.

CAD models are the most common form of computer-generated 3D visuals, which have also been visualized as color-coded models representative of the specific construction sequence of each visual CAD model component. Attempts at visual time sequencing that exist in the prior art are limited to a temporal selection of a subset of CAD models and their color attributes. The technique used to achieve this in the prior art uses a temporal table lookup that produces a snapshot-in-time visual result without maintaining any temporal context, which limits the custom applications to these scheduling spreadsheet type of datasets.

However, none of the prior art discloses a system capable of extracting from any information databank the complex temporal data relationships that change over time, so as to interactively present to the user a 4D visual representation of that dynamically changing data over time, maintaining both spatial and temporal context. Such a system is necessary to provide a natural user interface in all four dimensions (that is, the four dimensions being time plus each of the three spatial dimensions), to facilitate deriving knowledge from a higher level of understanding of the complex temporal data relationships embedded deep within and across large information databanks.

It is thus desirable to have a four-dimensional (4D) data browser, integrating a fully user-controlled time dimension with an interactive 3D visual scene, to produce a computer-based environment to create, view and analyze a multitude of 4D objects representative of the dynamic, complex temporal data relationships in large information databanks. With such a system to quickly, easily and naturally perform four-dimensional data analysis, it is possible to transform information databanks into a decision support knowledge base for the many processes in both the private and public sectors that rely on an understanding of dynamically changing data relationships.

SUMMARY OF THE INVENTION

The present invention remedies the above deficiencies in data analysis tools by providing the ability to interactively experience and naturally visualize the temporal progression of important data components, their attributes and most importantly their dynamically changing inter-relationships.

It is therefore an object of the present invention to provide a method and system for interactively accessing and analyzing, in all four dimensions, dynamic, temporal data relationships that change over time in any computer-based information database.

It is another object of the invention to provide a method to transform computer-based information databases into a 4D portal through which 4D objects are accessible in the combined temporal-spatial domain, representative of the dynamic, temporal data relationships and their attributes contained in information databases.

It is yet another object of the invention to provide a system for electronically serving 4D objects for access by users on remote computer workstations.

It is a further object of the invention to provide a system for interactive four-dimensional visualization, browsing and analyzing of 4D objects temporally and spatially by users on remote computer workstations.

The present invention makes it possible to build 4D portals into information databanks, through which computer-generated 4D worlds are served to users in a 4D browser, which can be naturally experienced in both temporal and spatial context to derive knowledge from the dataset. This 4D browser-server-portal system effectively transcends today's mostly 2D web browsers and servers, with some limited 3D capability, providing access to information both temporally and spatially. With the present invention, the progression of dynamic information over time can be visually analyzed and utilized on a wide range of industry and research applications.

The method according to the invention works as follows:

When an information database is transformed into a 4D portal, the 4D Administrator identifies the 4D objects of interest to be derived from the dataset. The exact nature of these 4D object definitions depends on the type of decision support function the 4D portal serves. 4D objects take the form of physical entities such as customers, operators, parts, packages, storage locations, transport vehicles, for example, but may also be abstract entities such as noise, vibrations, pollutants, for example, that are represented by some type of visual model in 3D space, such as translucent geometric impact volume shapes. Many databases that were initially designed using object-oriented database design techniques are already organized around objects that would be well suited as candidates for 4D objects. Those that directly contain dynamically changing attributes, or whose actions effect other objects, become qualified 4D objects. 4D object definitions contain direct references to data fields in the information database representing the 4D object attributes, or 4D object attributes that are derived from data fields using a defined function. 4D object definitions are also hierarchical in nature, such as buildings containing floors which contain office suites. Hierarchical 4D objects allow for varying spatial resolution when accessing a 4D portal through a 4D browser.

Once the 4D objects are defined, a 4D object audit trail is generated from the information database. The 4D object audit trail contains time-stamped records for every instance when a 4D attribute changes value, or the action of one 4D object affects another, such as a truck loading a container or a customer purchasing an item off the shelf. Many database management systems create daily audit trails for backup and recovery purposes which can be reorganized around the 4D object definitions. Historical database archives can also be used to create audit trails using difference checking, with the temporal resolution limited to the frequency of the archiving. Databases and spreadsheets containing event scheduling information are inherently timestamped audit trails that can be readily reorganized around 4D object definitions. Any information database can be reorganized into a 4D object audit trail. The process is facilitated by the database management system's toolset and query language.

The 4D portal includes the 4D object audit trail, a meta-data configuration file containing the complete 4D object definitions, as well as spatial geometry, reference and manifestations. A 3D visual model is created for every 4D object definition which is used by the 4D browser as the visual representation of every instance of that 4D object in the interactive visual scene.

The 3D visual models are created using 3D modeling toolsets, preferably a toolset such as MultiGen(R) which creates efficient geometric visual models that can be rendered at interactive update rates. Although many different modeling formats have been defined, most are portable from one toolset to another. The 3D model format that is selected to be a component of the 4D portal must be compatible with the available model loaders of the particular embodiment of the 4D browser rendering engine being used to browse this 4D portal.

A static visual world model of the 4D portal environment is also created which contains all of the 4D object visual models. The 4D portal model provides the background visuals in which the 4D objects are portrayed by the 4D browser, such as an aerial photo of an airport or community, or a floorplan layout for example. Static 4D object models, such as buildings, for example, are defined with a spatial location referenced to the 4D portal model. Dynamic, movable 4D object models, such as vehicles for example, are given a default spatial reference, but this location may be updated as a spatial manifestation of the 4D object audit trail data. The resulting 4D portal model is represented as a scene graph structure, such as that described in Silicon Graphics (R) Performer™ Programmer's Guide, which is incorporated herein by reference.

Many embodiments of 4D spatial manifestations are defined by 4D objects in the 4D portal. They include, but are not limited to, color, color ramp, scale, orientation, translation, articulation, texture, lighting/shadows, fade, translucency, and shape. 4D object definitions define their allowable spatial manifestations, associated attributes and necessary control parameters. Spatial manifestations are described further in the 4D browser below.

The 4D Server in the system according to the invention works as follows:

Users of 4D browsers generate 4D Open/Close, Query, Object Selection and Update requests that are processed and responded to by the 4D server, which acts as the communications hub between 4D portal databases and 4D browsers. When the 4D administrator initializes and activates the computer-based program which comprises the 4D server, the 4D portals are identified that are available through this 4D server. The location and access information is made known to the 4D server for available 4D portals, which are stored and maintained up-to-date by the 4D administrator utilizing a database management system, such as Oracle, for example. Requests are received from remote 4D browsers and responses returned by the 4D server encapsalated in network transmission protocols, such as HTTP, RMI, XML, for example.

The interface methods between the 4D server and the 4D browser and 4D portal can be of any type or form, but a preferred embodiment implements the 4D server as a Java™ servlet interfaced to a web server, such as Apache, for example, which communicates to a remote 4D browser via requests and response encapsalated in HTTP communication protocols. As a Java™ servlet, the 4D server interfaces with the 4D portals via JDBC™ protocols. This embodiment not only allows 4D portals to exist on computer systems remote to the 4D server, but also allows the 4D server and 4D portals to be maintained behind a security firewall, yet still permit communication to remote 4D browsers outside the firewall.

The 4D server responds to the Open request by establishing a session between the requesting 4D browser and the specified 4D portal. The 4D server opens a database connection to the 4D portal and transmits to the 4D browser the 4D object definitions, 4D object visual geometric model definitions, the 4D portal world model, and meta-data describing the available 4D object audit trail, such as its overall time frame, number of instances of each 4D object, allowable spatial manifestations and 4D object actions, for example. Alternatively, the 4D administrator may distribute static 4D portal information, especially the large visual models dataset, on CD or other medium to appropriate 4D browser users, in which case the Open request may specify which 4D portal information is to be downloaded from the 4D server and which will be loaded locally from CD or other medium. Access to 4D portals may be password protected, in which case the Open request contains user/password information that is verified by the 4D server before opening the session. The Close request terminates the session established by the Open request.

The 4D server responds to the Query request by transmitting 4D object state definitions back to the 4D browser. These 4D object states are preferably generated in the following manner: First, the SQL selection statements contained in the 4D query request is executed against the 4D audit trail database to extract 4D object instances of interest for this query into a result set. Next, the maximum temporal and spatial resolutions specified in the 4D query request are satisfied by binning the result set 4D object instances into appropriate groupings. For example, if the temporal resolution specified is 'day', then all audit trail events time-stamped for any time during a given day are grouped into one bin representing the overall change in the 4D object attribute of interest at the end of the day. Spatial binning is also done, such as accumulating building information as a summation of all of its floors leased space, for example. Of course, detail may be lost in this binning process, but it allows for 4D data drill-down by respecifying a new 4D query requesting more detail of a particular 4D object. Finally, the binned, selected audit trail object data is converted to 4D object states by first sorting the data by object, in time order, and then scanning the data to stretch each time-stamp into a time frame as necessary. For example, if a 4D object changed on day 1, but didn't change again until day 4, then the day 1 bin would be converted into the object's state for the time period day 1 through day 3, since that state will be maintained until it changes on day 4.

The 4D server also processes the 4D object selection request. This request specifies a particular 4D object of interest and a specific time reference. The 4D server responds to this request by building a web-browser displayable page of information about the 4D object of interest at the specified point in time. Based on the 4D object audit trail, the values of the 4D object's attributes at the current specified time are displayed. If the 4D object state at the current specified time was binned either temporally and/or spatially, the raw audit trail entries comprising the binning are also displayed tabularly. This dynamically created web page is built using web page languages, such as HTML or XML. The 4D server transmits the completed web page back to the 4D browser.

When the 4D server receives an update request, any changed 4D object definition values or time frames accompanying the update request are exported into an external data file. The 4D administrator may use this data file as a change request to the information database and/or the 4D object audit trail. This data file may also be referenced in a 4D Query request, in which case the saved changes would be applied to the generated 4D object state dataset as the response to the query request is transmitted back to the 4D browser.

The 4D Browser in the system according to the invention works as follows:

The 4D browser is a computer-based program that is installed on every 4D user's local computer workstation. Workstations may also download the current 4D browser application from a centralized application service provider, if desired. The 4D browser, in it's preferred embodiment, is a Java™ based graphical user interface (GUI) application providing appropriate GUI widgets (buttons, sliders, choices, etc.) for the user to readily perform the necessary browser functions described below. The additional browser render window, described below, in it's preferred embodiment is a Java3D™ based program, but may be C-based utilizing other 3D graphics APIs such an OpenGL™ or SGI's native Performer™. In the preferred embodiment, the communications link between the 4D browser GUI and its render window utilizes networking protocols, which allows the render window to be activated on a computer system either remote to or the same as the one on which the 4D browser GUI is executing.

After activating the 4D browser, the user opens a 4D portal by sending the appropriate Open request to a 4D server, identified by a specific network address and port, as previously described in the 4D server above. Once the 4D portal object definitions have been loaded into the 4D browser, the user activates a 4D browser render window, specifying the network address of the 4D browser GUI the render window is to communicate with. The render window initially visually displays the 4D portal's 3D world model as well as all of the 4D object models at their default spatial locations. The user utilizes the mouse or other appropriate interface device to move the default viewing point to other locations by flying through the visual scene. Any type of motion model may be utilized, but the preferred embodiment utilizes a basic mouse or joystick controlled basic six-degree-of-freedom flight model to move through the 3D visual scene in the 4D browser render window.

Through the 4D browser GUI, the user specifies a 4D query that is transmitted for processing by the 4D server as described earlier. The user may select from a predefined set of 4D queries that the 4D administrator has made available as part of the 4D portal, or may manually build or modify 4D query components through the 4D browser GUI. In its preferred embodiment, the 4D query specification is a human-readable ASCII data specification. The 4D object states that the 4D server generates in response to the 4D query are received by the 4D browser GUI and transmitted to the active render windows as well. Multiple 4D queries may be requested. Each time a new set of 4D object states replaces the previous one.

The 4D object state definitions are accessible through the 4D browser GUI. The user may perform what-if analyses by manipulating the time frame of any 4D object states in the 4D browser GUI. Any modifications made in the GUI are immediately transmitted to the render window as well. Spatial what-if analyses may be performed by using the mouse to select and relocate a visual 4D object model in the rendered visual scene, causing the render window to update the spatial location of the 4D object in the GUI. Modifications made by the user in the 4D browser may be sent to the 4D server as an update request, or may be saved locally as local 4D portal data. To access another 4D portal in the 4D browser, the user closes the current 4D portal session.

The time controller is a special 4D browser GUI component that allows the user to control the progression of time, either forwards or backwards, at various resolutions. The preferred embodiment of the time controller is a slider widget whose resolution is selectable in various intervals, such as years, months, days, hours, minutes, seconds and frames (1/30 of a second). A special wall time resolution also allows time to be incremented at a rate equivalent to real time. Forward, reverse, pause and record controls are also provided to allow for hands-off progression of time. Any change in time is immediately transmitted to the 4D browser render window as well. The record option in the time controller enables the 4D browser to record to a disk file the rendered visual scene each time interval in a format such as RGB or JPEG that is compatible with multi-media movie-making tools.

The 4D browser render window is controlled by a computer program that executes a render loop that terminates only when the render window is closed. Each pass of the render loop utilizes a scene traversal technique wherein as the 4D portal scene graph is traversed, each 4D object model is modified by the specified spatial manifestation in the 4D object's current object state definition. All of the 4D object states are received from the 4D browser GUI after a query request is processed by the 4D server, and each time that the current time value is modified in the 4D browser it is compared to each 4D object state time frame to determine the active object state and associated spatial manifestation for each 4D object model. Time frame specifications contain absolute start and end time values, or time masks that represent repeating time frames, such as a wildcard*value for the year value, for example, indicating that this object state time frame applies to the specified period in any year. 4D object states that are skipped over from one time specification to the next are also processed to maintain temporal context.

4D object state spatial manifestations can be static for the entire time frame, such as a color or texture pattern representing the object state, or progressive over the entire time frame, such as a ramping colormap, changing size (scale/shape), position (orientation/translation/articulation), or transparency (including object fade in/out). By default the progressive function is linear, but other parametric functions can be specified as spatial manifestation control parameters in the object state definition.

Object fade in/out is a special 4D browser spatial manifestation that transforms the spatial level-of-detail(LOD) graphics fade technique into the temporal domain. Spatial LOD calculations are based on an object's distance from the eyepoint. To achieve a temporal LOD fade, the 4D browser internally adjusts the spatial fade range of the object model in the scene graph to be equivalent to the relationship of current time to the 4D object state's time frame. For example, if the 4D object model is x feet from the eyepoint, and current specified time is 50% into the 4D object's current object state time frame, then the spatial fade out range could be set to 2x, causing the spatial range rendering to display the 4D object model as half faded out, representative of the temporal object progressive state. These fade ranges are recalculated every time any temporal or spatial movements are made.

Another special 4D browser spatial manifestation relates to a positional 4D object state. In particular, object translation is described here, although the same technique applies to orientation and articulation mapped to different coordinate reference systems. A 4D object's XYZ position in the 4D portal world model can be specified in a 4D object immediate state, such as a datapoint generated from a time-space-positional information (TSPI) system like GPS-tracking, or with a 4D object progressive state, such as a vehicle moving from point A to B over the specified time frame. This motion is linear both temporally and spatially unless specific guideways and motion profiles are defined in the object state's spatial manifestation control parameters.

Guideways are an attached sequence of line segments positioned in the 4D portal world model. These guideways can be generated with a point-and-click utility, or by a sophisticated tool such as MultiGen(R) RoadTools utility. The raw guideway definitions are processed by the 4D server to disassociate them from their positional data, converting each guideway segment definition in the 4D portal dataset to a length and position relative to adjacent guideway segments. The associated motion profiles in the defined spatial manifestation produce progressive positions that specify the 4D object's guideway position relative to its distance from the beginning of the guideway. The 4D browser identifies the current guideway segment and the object's percentage into this segment, looks up the segment endpoints XYZ values from the original guideway specification and does a linear interpolation to determine the actual current XYZ location of the 4D object. This special guideway spatial manifestation technique allows for motion profiles to be performed on abstract guideways that are rendered by a 4D browser properly registered to every dip, bend and bank of a motion path through the 4D portal world model.

Other features and advantages of the present invention will become apparent from the following description of the preferred embodiments which refers to the accompanying drawings.

BRIEF DESCRIPTION OF THE DRAWINGS

For the purpose of illustrating the invention, there is shown in the drawings an embodiment which is presently preferred; it being understood, however, that the invention is not limited to the precise arrangements and instrumentalities shown.

In the drawings, wherein like reference numerals denote like elements throughout the several views:

FIG. 3 is a flow diagram of the operation of the 4D server in the system according to the invention.

DETAILED DESCRIPTION OF THE PREFERRED EMBODIMENTS

Figure 1:
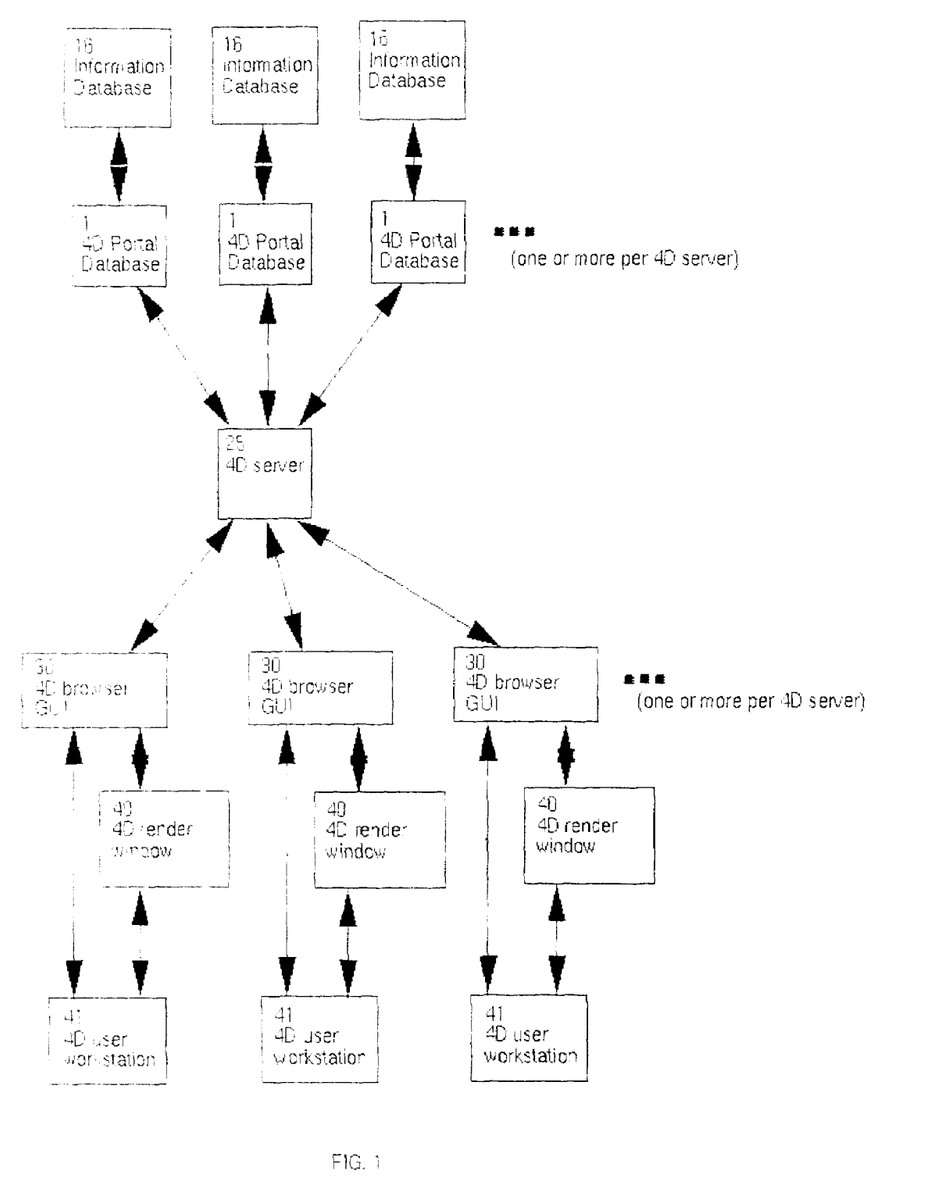
FIG. 1 is a block diagram of the system components according to the invention.

Referring now to the drawings, there is shown in FIG. 1 a block diagram of the system components according to the invention. Using the method described in FIG. 2 below, 4D portal databases 1 are derived from information databases 16. The 4D server 25, described in FIG. 3 below, accesses one or more 4D portal databases 1 and transmits 4D portal information to one or more 4D browsers 30, described in FIG. 4 below. 4D portal databases 1 may reside on the same computing system as the 4D server 25, or on a remote computing system accessed by the 4D server 25 via a network connection. For a single user system, the 4D browser 30 may also reside on the 4D server 25 computing system, although the preferred embodiment comprises multiple 4D browsers 30 residing on remote 4D user computer workstations 41 communicating with the 4D server 25 via a network connection. Both the 4D browser GUI 30 and 4D browser render window 40 may reside on the same 4D user computer workstation 41, but, as described in FIG. 4 below, with the preferred embodiment comprising a network transmission between the 4D browser GUI 30 and the 4D render windows 40, they may also reside on separate 4D user workstations 41, either locally or remotely connected via a network. Multiple 4D render windows 40 on remote 4D user computer workstations 41 may also communicate with a single 4D browser GUI 30. Individual components are described in detail below.

Figure 2:
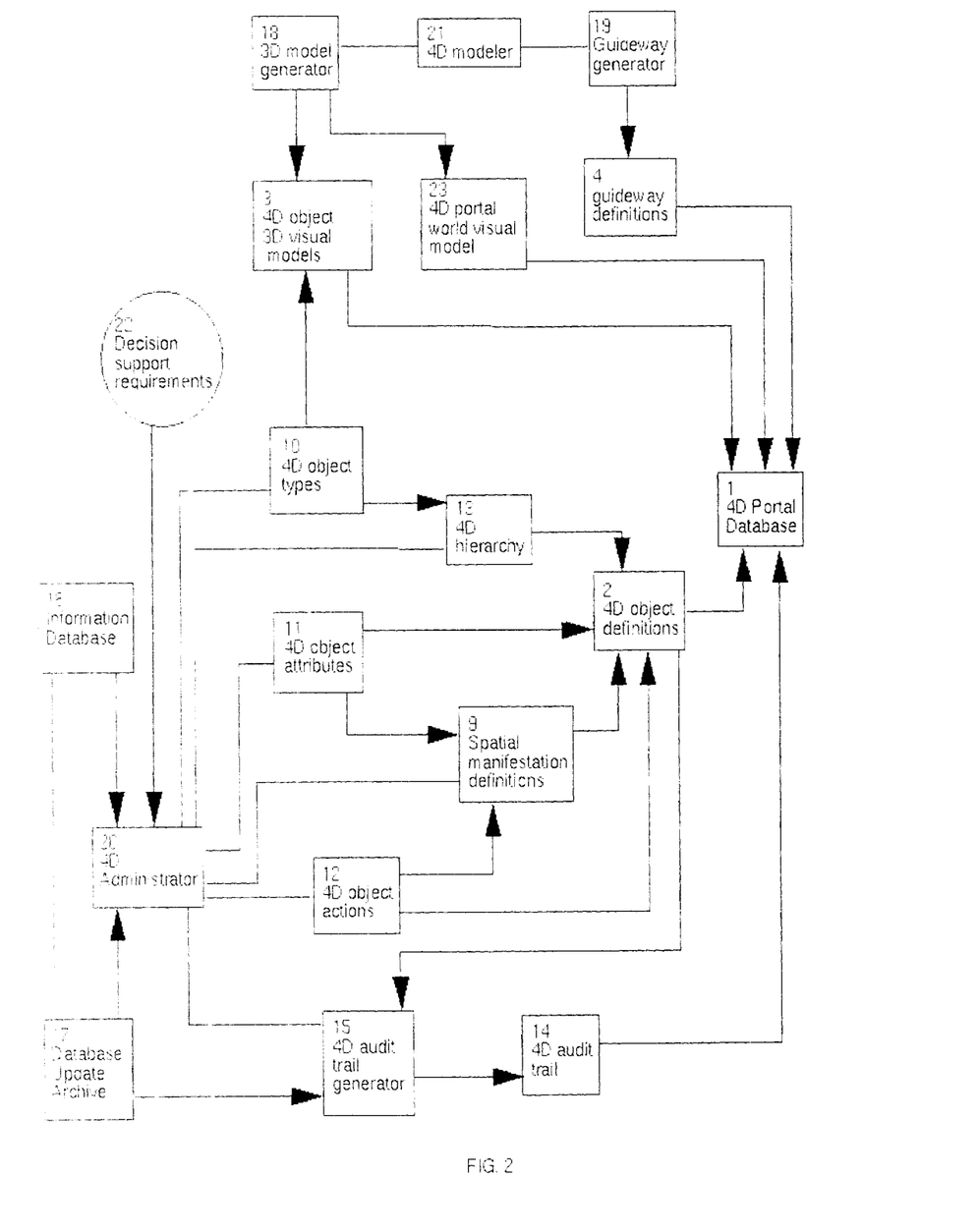
FIG. 2 is a flow diagram of the method to transform information databases into 4D portals according to the invention.

Referring now to FIG. 2, there is shown a flow diagram of the method to transform information databases into 4D portals according to the invention. The method produces a 4D portal database 1 from any information database 16.

The method begins with the 4D administrator 20 identifying a set of 4D object types 10. This is accomplished by first reorganizing and extracting data subsets from an information database 16 that contains data representable by a 3D visual object model 3, including real world physical entities as well as visual models for more abstract datasets representing items such as environmental noise, for example. These data groupings represent the candidate 4D object types 10. Those data groupings that are static in nature, that is, have a fixed number of instances and no data values that change over time, become part of the 4D portal world model 23, and are removed from the list of 4D object types. Based on the decision support requirements 22, provided to the 4D administrator by management, for which the 4D portal 1 is being built, the 4D administrator 20 may also remove 4D object types 10 that are of no apparent interest to management. The 4D administrator 20 may also organize the 4D object types 10 into a 4D object spatial hierarchy 13, such as buildings that contain floors, to provide for a spatial resolution drill-down capability in the 4D portal 1.

Those data values of each 4D object type 10 dataset that change over time in the information database 16, including its associated database update archive 17, are identified by the 4D administrator 20 as 4D object attributes 11, which definition maintains the link back to its representative data field in the information database 16. The 4D administrator 20 also evaluates the list of 4D object types 10 for inter/intra-dependencies, that is, actions taken by one 4D object type that has an effect on another, such as a vehicle object moving a container object to another location, or on itself, such as inserting a new instance of this 4D object type. These actions are defined in a list of 4D object actions 12. 4D object actions 12 are grouped in temporally opposite pairs, such as insert:remove, attach:detach, start moving from point a: arrive (stop) at point b, for example, which make the actions temporally reversible.

The 4D administrator 20 defines a set of potential spatial manifestations 9 for each 4D object attribute 11 and 4D object action 12. The set of available spatial manifestations are defined by the visual capabilities of the 3D graphics scene graph rendering engine implemented in a preferred embodiment of the 4D browser system described in FIG. 4., and includes, but is not limited to, color, color ramp, scale, XYZ translation or articulation, guideway translation or articulation, HPR and guideway orientation, texture file mapping, lighting/shadows, temporal fade, translucency and shape. The ability to affect these visual manipulations with 4D portal data is achieved by this method of defining these spatial manifestations 9.

The 4D administrator 20 gathers the 4D object types definitions 10 organized in a 4D spatial hierarchy 13, 4D object attributes definitions 11, 4D object actions definitions 12 and spatial manifestation definitions 9 into a set of 4D object definitions 2. The preferred embodiment of these 4D object definitions 2 is a human-readable meta-data format, such as ASCII, defining 4D object parameters gathered together into one definition format.

For every 4D object type 10, the 4D modeler 21, or a group of 4D modelers, utilizing a 3D realtime visual model generator 18 toolkit such as MultiGen(R) Creator, builds a representative 3D geometric visual model 3 of the object. The 4D modeler 21 also builds a 4D portal world model 23 representing the static visual scene that the 4D object visual models 3 are rendered in by the 4D browser. Preferably, each 4D object visual model 3 is defined with a spatial location referenced to this 4D portal world model 23 scene graph, and becomes a sub-graph component of this 4D portal scene graph.

The 4D modeler 21, utilizing a guideway generator 19 toolkit such as MultiGen(R) RoadTools, creates guideway definitions 4 for the defined set of potential spatial manifestations 9.

The 4D administrator 20 takes the current information database 16, available database update archives 17, and the set of 4D object definitions 2, and processes them through a 4D audit trail generator 15 to create the 4D audit trail 14. The 4D audit trail 14 includes time-stamped records for every instance when a 4D object 2 instance performs a 4D object action 12 or has a change in one of its 4D object attributes 11, which can be derived from the identified set of source data via difference checking. For 4D object actions, there is an associated end action, such as destroy or stop motion, for example, for each begin action, such as create or start motion, respectively. The database update archive 17 may be a set of historical snapshots of the information database, or may include daily backup/recovery audit trails that are generated by the associated database management system which aids in the audit trail generation and increases its temporal resolution.

The 4D audit trail generator may be a manual procedure, but since it will likely be done on a regular basis to keep the 4D audit trail 14 current, its preferred embodiment comprises a database scripting language batch job and/or a customized computer program to automate the procedure.

The 4D audit trail 14, together with the 4D object definitions 2, 4D portal world visual model 23, 4D object visual models 3 and guideway definitions 4 are gathered into a 4D portal database 1 which is accessed by the 4D server. In its preferred embodiment, this 4D portal database 1 is implemented in a relational database management system, such as Oracle.

The 4D administrator 20 is preferably responsible for more than one 4D portal database 1. Although the complete method described in FIG. 1. may be a manual procedure, its preferred embodiment includes utility computer programs that assist the 4D administrator 20 in creating and maintaining a 4D portal database 1.

Referring now to FIG. 3, there is shown a flow diagram of the operation of the 4D server in the system according to the invention. The 4D server accepts 4D browser requests 6 from multiple 4D browsers, described in FIG. 4 below, and generates appropriate 4D server responses 7 back to the 4D browsers. This function is performed by the 4D server program 25, which in its preferred embodiment is a Java™ servlet computer program interfaced to a web server, such as Apache. Although any network protocol may be utilized to receive 4D browser requests 6 and transmit 4D server responses 7, the preferred embodiment allows for these requests and responses to be encapsalated in HTTP message packets received and transmitted by the front-end web server locally interfaced to the 4D server program 25.

The 4D server program 25 generates appropriate responses for 4D browser requests 6 by accessing the specific 4D portal database 1 identified in the 4D browser request. Multiple 4D portal databases 1 may be accessible through a single 4D server. In its preferred embodiment, the 4D server program 25 accesses 4D portal databases 1 utilizing the java JDBC™ interface, allowing 4D portal databases 1 to be resident locally on the same computer as the 4D server program 25, or on a remote computer system accessible over a network. The 4D browser requests 6 processed by the 4D server program 25 include, but are not limited to, open, close, query, object selection and update.

In response to an open request, the 4D server program 25 extracts and transmits the 4D portal definition 26 from the specified 4D portal database 1. 4D portals may be access protected; if so, the access password contained in the open request is verified before access to the specified 4D portal database 1 is permitted. The 4D portal definition includes 4D object definitions 2, 4D portal world visual model 23, 4D object visual models 3 and guideway definitions 4 (all shown in FIG. 2). The 4D server program preprocesses guideway definitions, augmenting the definition with an ordered list of segment lengths before including them in the 4D portal definition 26. Static 4D portal data, such as the large visual model dataset, may be distributed locally to 4D browser users on CDROM or other media for local storage. The open request specifies 4D portal data components to be loaded locally to reduce the transmission size of the 4D server response 7. The open request is designed to proceed all other browser requests on a specific 4D portal database 1. When the 4D server program 25 receives a close request, it accepts from the specific 4D browser system a new open request on a different 4D portal database 1.

In response to a query request, the 4D server program 25 generates and transmits a set of 4D object states 5. This set is preferably generated as follows: The SQL selection statements contained in the query request is executed against the 4D audit trail 14 contained in the 4D portal database 1 to create a result set. This result set is then binned according to the maximum temporal and spatial resolutions specified in the query request. The bins are then sorted by 4D object, in time order. The resulting ordered list is then scanned and, for 4D object attribute entries, each time-stamp is stretched into a time frame inclusive of any time gap preceding the next time stamp for that attribute. For 4D object action entries, they exist in begin-end pairs, such as create-destroy or start motion—stop motion. During the scan, each action pair is combined into one object state for the specified begin-end time frame. This results in the set of 4D object states 5 transmitted as the 4D server response 7. In an alternate embodiment, the 4D server program 25 responds with a 4D server response 7 containing the initial result set, with the 4D browser described below performing the binning and time frame processing.

In response to an update request, 4D object definition values or object state time frames contained in the 4D browser request 6 are exported by the 4D server program 25 to a local external update file 27. If an update file is specified in an open request, any 4D object definition changes contained in the specified update file 27 are applied to the 4D portal definition 26 transmitted as the 4D server response 7. Similarly, if an update file is specified in a query request, any 4D object state time frame changes contained in the specified update file 27 are applied to the 4D object states 5 transmitted as the 4D server response 7.

In response to an object selection request, the 4D server program 25 generates and transmits a web browser displayable page 8 of information about the selected 4D object that is temporally accurate for the specified time stamp. This is achieved by the 4D server program 25 scanning the 4D object states 5 last transmitted to the requesting 4D browser for current object attribute and action states for the specified time. The web page 8 is created utilizing web page techniques, such as HTML or XML. The content of the web page 8 may be anything, but its preferred embodiment includes attribute values and raw 4D audit trail 14 entries represented by any binned current object states.

Figure 4:
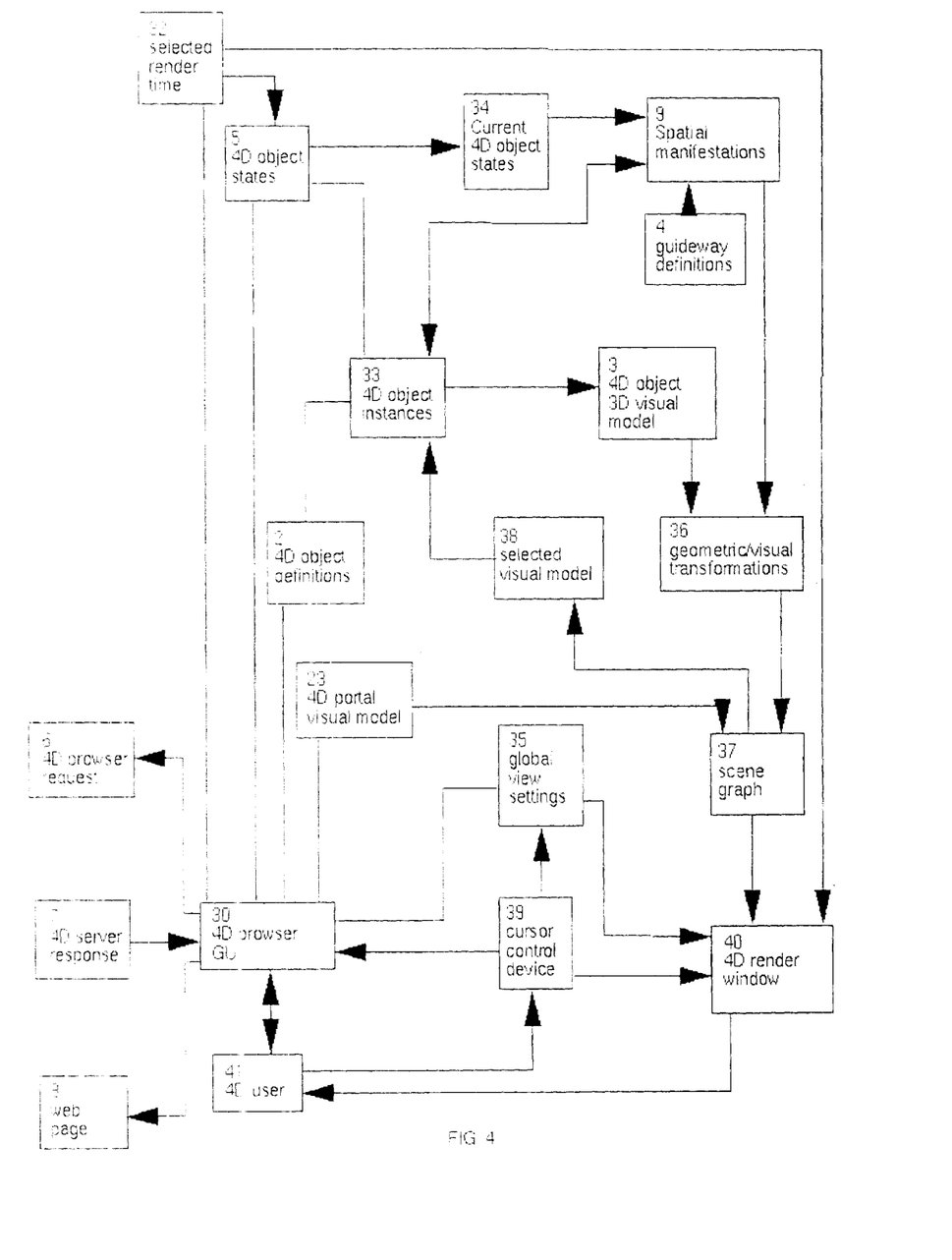
FIG. 4 is a flow diagram of the operation of the 4D browser in the system according to the invention.
Figure 5:
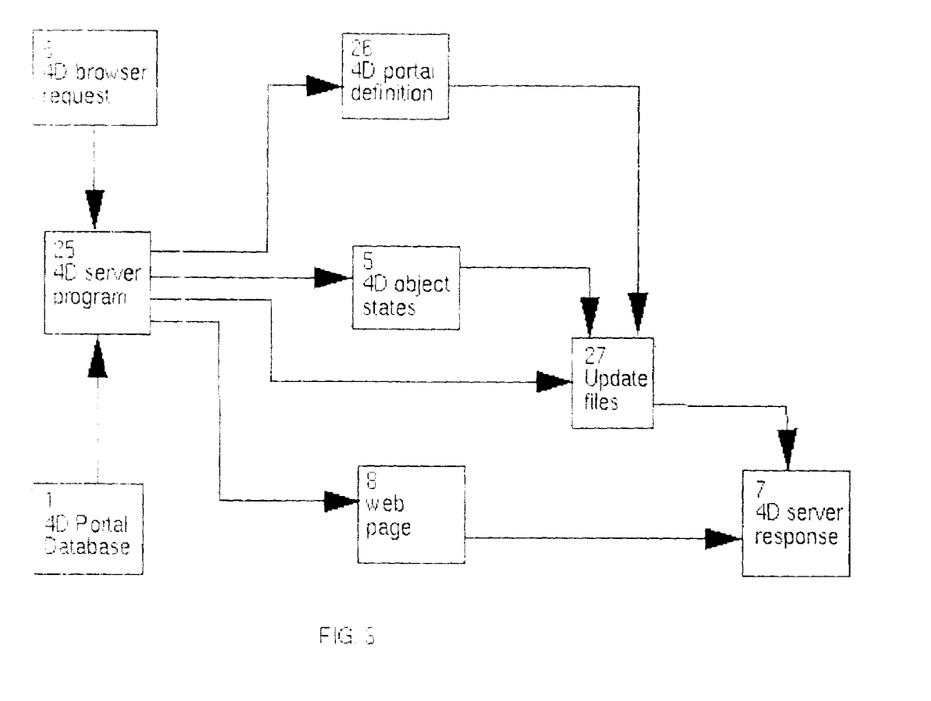

Referring now to FIG. 4, there is shown a flow diagram of the operation of the 4D browser in the system according to the invention. The two main components of the 4D browser are the 4D browser GUI 30 and the 4D browser render window 40, which in their preferred embodiments are separate computer programs with a data interface implemented with network protocols. The render window 40 may execute on the same or different machine as the 4D browser GUI 30, but for effective interactive visual graphics rendering preferably executes on a computer with a 3D-hardware-accelerated graphics subsystem. The 4D user 41 begins the execution of both these programs locally, and interacts with them via the local keyboard and a cursor control device 39 such as a mouse, joystick or trackball.

The 4D browser GUI 30 provides the 4D user 41 with a set of screen GUI widgets, such as buttons, sliders, choice and list boxes, which enables the 4D user 41 to generate 4D browser requests 6 which were described above in FIG. 3, as well as view and optionally modify 4D portal data received via 4D server responses 7, such as 4D object definitions 2, spatial manifestations 9 and 4D object states 5. In its preferred embodiment, the 4D portal model 31 and 4D object visual models 3 in the 4D browser GUI 30 are filename references to local data files that maintain the specific scene and model geometry specifications. All updates to any data value in the 4D browser GUI 30, either by the 4D user 41 or 4D server responses 7, is immediately accessible by the render window 40. One embodiment to accomplish this is via a shared memory segment, although the preferred embodiment communicates data updates via network protocols over the data interface to the active render window 40.

The 4D browser GUI 30 also allows the 4D user 41 to manipulate global view settings 35, such as render mode (wireframe or surface), enabling textures, sun position, viewpoint XYZHPR location, selected viewpoint motion mode, for example, which are utilized by the render window 40 to control attributes of the rendered graphics scene on the computer screen. The viewpoint location is also moved by the 4D user 41 in all three spatial dimensions via the use of the cursor control device 39 in the render window 40.

The 4D browser GUI 30 also displays web pages received via a 4D server response 7, either by reference to a webpage filename on the 4D server computer system or by a stream of webpage directives, such as HTML. In its preferred embodiment, it does this by executing a web browser program on the 4D user's 41 computer workstation.

The 4D browser GUI 30 also provides the 4D user 41 with a special time controller widget to interactively control the fourth dimension of time by manipulating the selected render time 32 value. The preferred embodiment of the time controller includes a slider bar to manually move time forward or back, time resolution choice selection, and forward, reverse, pause and record buttons similar to that on a VCR for automatic time updates. The record feature activates a global view setting 35 that causes the render window 40 to save its rendered visual scene to a local disk image file each time it is updated.

The 4D browser render window 40 graphically renders the temporally current 3D visual scene, viewed by the 4D user 41 at the current spatial viewpoint location, representing the present 4D portal manifestations in all four dimensions. In its preferred embodiment the render window 40 computer program executes a scene graph render loop, such as that contained in Java3D™ or SGI's Performer™, augmented by specialized 4D functionality described below, that displays an interactive 3D visual scene in the screen render window. The scene graph 37 includes the 4D portal world visual model 31, as well as numerous subgraphs for each current 4D object instance 33 containing the geometry of the specified 4D object visual model 3.

The preferred embodiment of the render window 40 computer program is a free-running render loop that performs the following functions: If the selected render time 32 changes, the new current 4D object state 34 for each 4D object instance 33 is identified by scanning the temporally-ordered list of 4D object states 5, either backwards or forwards depending on which direction time was moved, beginning with the previous current 4D object state 34, finding the 4D object state 5 whose time frame contains the new selected render time 32. If through the 4D browser GUI 30 the time-frames of any 4D object states 5 were modified, the above selection process is also done, but may be limited to the 4D object instances 33 affected by the modification.

The specified spatial manifestations 9 are then processed for each current 4D object state 34, as well as any 4D object states 5 that were skipped over in the above selection process, in time order to maintain temporal context of the 4D object states. The processing of spatial manifestations 9 may create/remove 4D object instances 33 whose subgraph would also be inserted/deleted from the scene graph 37, or may affect the visual appearance or location/orientation of the 4D object visual models 3 of existing 4D object instances 33 via geometric/visual transformations 36 to the scene graph 37. More details of spatial manifestation processing is described below.

The render window 40 render loop activates the current global view settings 35, and culls scene graph 37 subgraphs that are outside the viewing frustrum specified in the global view settings 35, or whose associated 4D object has been visually deactivated by the 4D user 41 via the 4D browser GUI 30. The geometry contained in the remaining active scene graph 37 is rendered relative to the current viewpoint location into the graphics engine of the computer workstation for visual display to the 4D user in the screen render window 40.

Spatial manifestations 9 of 4D object states 34 may take numerous forms. Embodiments of spatial manifestations effect changes to the scene graph 37, either via geometric/visual transformations 36 to the 4D object instance 33 subgraph containing the 4D object visual model 3, or by inserting/removing a subgraph containing a 4D object visual model 3 for a new/old 4D object instance 33. The preferred embodiment includes spatial manifestations 9 for visual techniques supported by the underlying scene graph rendering graphics API, including, but not limited to, static color change, progressive color ramp, static or progressive object scale factor, orientation, translation, articulation, texture image application, translucency and object shape. In addition, the preferred embodiment supports special 4D techniques including progressive temporal fade in/out and guideway translation, described below. An alternative embodiment effects certain spatial manifestations, such as color or scale, which are supported by the underlying graphics API with immediate mode graphics commands in node callback routines which are processed as each subgraph is reached in the scene graph traversal during the drawing process. This embodiment does not directly modify the scene graph 37, so spatial manifestations 9 using this technique are effected each time the render window 40 is updated.

Spatial manifestations of the progressive nature define a visual effect over a specified range, such as movement from point a to b, color from light red to dark red, or scale factor from 4 to 8, for example, which are processed in direct proportion to the percent value that the selected render time 32 falls within the current 4D object state's 34 time frame associated with this spatial manifestation 9. Multiple spatial manifestations 9 may be active for any given current 4D object state 34.

The temporal fade out special spatial manifestation 9 is processed as a visual transformation 36 which affects the spatial level-of-detail fade range of the associated 4D object visual model 3 scene graph 37 subgraph. The ratio of the fade range to the current distance of the 4D object model 3 from the viewpoint is in reverse proportion to the fractional percentage value that the selected render time 32 falls within the current 4D object state's 34 time frame associated with this spatial manifestation 9. For a temporal fade in manifestation, the remaining time frame fractional percentage is used.

The guideway translation spatial manifestation 9 is processed utilizing the 4D portal guideway definitions 4 to manifest a 4D object model's 3 motion path in the scene. The preferred embodiment of geometric transformations 36 of the motion nature is via a dynamic coordinate node in the appropriate scene graph 37 subgraph representing the 4D object visual model 3, allowing the model to be located anywhere and in any orientation in the scene. The preferred embodiment includes a default linear motion profile over the entire specified guideway length over the duration of the associated current 4D object state's 34 time frame. Simple motion manifestations from point a to b have an implied single segment line guideway to follow. Additional motion parametrics may be specified to effect different motion profiles, such as acceleration or constant speed, for example, during different periods of the time frame. Using these parameters the distance traveled from the beginning of the guideway relative to the fractional percentage value that the selected render time 32 falls within the current 4D object state's 34 time frame associated with this spatial manifestation 9 is calculated. Using the 4D portal guideway definition 4 data, the current guideway segment and the 4D object visual model 3 offset into this segment is identified for the calculated distance traveled. A linear interpolation between the segment endpoint XYZHPR values yields the current manifested 4D object model 3 XYZ location and HPR orientation in the scene, which are used to transform the appropriate scene graph 37 subgraph's dynamic coordinate node.

The 4D user 41 may, through appropriate global view settings, place the cursor control device 39 of the render window 40 in motion mode or picking mode. Various motion modes are available to the 4D user 41 representing a variety of motion control models that are included in the embodiment of the render window. In motion mode, manipulating the cursor control device 39 moves the render viewpoint location to a new XYZHPR location in accordance with the active motion control model. In picking mode, the cursor control device 39 is used to select a 4D object instance from the visual scene and either spatially relocate it, or generate a 4D browser object selection request 6 through the 4D browser GUI 30. A 3D picking algorithm is used, such as a line-of-sight ray intersection calculation, to identify the selected 4D visual model 38, which is identified by its scene graph subgraph as a specific 4D object instance 33 which can be spatially repositioned in the scene graph 37 or made part of an object selection 4D browser request 6.

As a simple example, consider an online information database of a food store operation, where the manager needs a better understanding of the store operation to improve efficiency and increase sales. A 4D portal into this information database could define grocery items, shelf units and customers as 4D objects. The 4D portal world rendered by the 4D browser includes a 3D model of the store interior in which shelf units and the grocery packages they contain are situated. The 4D world could also extend as a 3D map of the local community to visualize customer homes and visually track the groceries they purchase. The 4D audit trail is populated with events every time the online database is updated when a grocery item barcode is registered at the checkout counter by a customer, identified by their credit card information, as well as stockboy actions to replenish grocery items on the shelf locations and new grocery deliveries received in the stockroom. The 4D server can generate 4D object states representing the movement of grocery items from the stockroom to the shelves and eventually to customer homes. The store manager can use the 4D browser to analyze the movement of grocery items as it progresses over time to gain an understanding of his customer's buying habits as it relates to grocery items, shelf locations and quantities relative to other grocery items, relative proximity and customer ease of access to the store, time of day, household types and sizes, and so on, which can help effect operational modifications to the store operations to better serve and expand its customer base, improving efficiency and increasing sales. This example is provided to augment the previous description with a brief real world application of the present invention. It is not intended to limit the scope of the invention in any way, which can certainly be utilized by those skilled in the art in many applications, including, but not limited to, inventory control, traffic management, space planning, logistics and operations analysis, facility and property management, environmental impact studies, security systems, construction management and historical analysis.

Although the present invention has been described in relation to particular embodiments thereof, many other variations and modifications and other uses will become apparent to those skilled in the art, without departing from the spirit and scope of the invention.

What is claimed is:

1. A system to interactively access and analyze temporal data relationships that change over time, the system comprising:

one or more 4D portal storage mediums containing 4D portal information, the 4D portal information representing at least three spatial dimensions and a time dimension;

one or more 4D browser programs adapted to access the one or more 4D portal storage mediums and convert the 4D portal information into one or more 4D objects to be rendered in a 3D scene, wherein the one or more 4D browser programs are further adapted to use the 4D portal information to render and manipulate at least one of a temporal and spatial manifestation of the one or more 4D objects independent of the 3D scene, and wherein the one or more 4D portal browser programs are further adapted to enable a user to simulate traveling back and forth through the time dimension to represent the 4D object at one or more particular times; and one or more 4D portal windows adapted to receive and display the 4D objects in the 3D scene.

2. The system according to claim 1, further comprising one or more information databases from which the 4D portal information is derived.

3. The system according to claim 2, wherein the 4D portal information includes 4D object definitions, 4D object attributes, 4D object actions and 4D object time-stamped audit trail data.

4. The system according to claim 3, wherein the 4D portal information is augmented with spatial manifestation definitions, guideway definitions and 3D visual models for each 4D object definition.

5. The system according to claim 4, wherein the 4D object attributes and 4D object actions are associated with one or more spatial manifestation definitions.

6. The system according to claim 5, wherein the spatial manifestation definitions include insertion/removal of a 4D object, color, color ramp, scale, orientation, translation, articulation, texture patterns, lighting effects, translucency, or shape.

7. The system according to claim 6, wherein the spatial manifestation definitions further include 4D temporal fade in/out and guideway translation/orientation definitions utilized by the 4D browser program to manipulate one or more 4D objects in the 3D scene.

8. The system according to claim 7, wherein the spatial manifestation definitions are static.

9. The system according to claim 7, wherein the spatial manifestation definitions are progressive.

10. The system according to claim 4, wherein the guideway definitions and the 3D visual models of each 4D object definition are spatially referenced to and visually rendered in the 4D portal windows.

11. The system according to claim 3, wherein the 4D object attributes are calculated by applying a function to one or more data fields of the information database.

12. The system according to claim 3, wherein the 4D object attributes correspond to one or more data fields of the information database from which the 4D portal information is derived.

13. The system according to claim 12, wherein the 4D object actions represent events in time which effect one or more 4D object attributes.

14. The system according to claim 3, wherein the 4D browser program is further adapted to generate 4D object states from the 4D portal information.

15. The system according to claim 14, wherein the 4D portal information is temporally and spatially binned so as to represent time frames of the 4D object states at selectable temporal resolutions of the 4D objects in selectable levels in a spatial hierarchy.

16. The system according to claim 15, wherein the time frames include one or more time masks which specify repeating time periods.

17. The system according to claim 1, wherein the 4D browser program creates an interactive 3D computer-generated scene in one or more 4D portal windows that is manipulated by one or more users of the system.

18. The system according to claim 1, further comprising:

a communications system connected between the one or more 4D portal storage mediums and one or more 4D browser programs, the communications system being adapted to process 4D portal information into 4D object states and transmit the 4D portal information and the 4D object states to one or more 4D browser programs.

19. The system according to claim 18, wherein the 4D browser program includes access privileges to the 4D storage mediums, and wherein the communications system is further adapted to validate the 4D browser program access privileges to the 4D storage mediums in response to a request for access by one or more of the 4D browser programs.

20. The system according to claim 19, wherein the access privileges to the 4D storage mediums include open, query, select, update and close, and wherein the communication system responds to the request for access by retrieving the corresponding 4D portal information from the 4D portal storage medium.

21. The system according to claim 20, wherein the communication system processes the 4D portal information into 4D object states and webpage content and transmits the 4D portal information, the 4D object states and the webpage content to the 4D browser program according to the request for access.

22. The system according to claim 18, wherein the communications system is connected between the one or more 4D portal storage mediums and the one or more 4D browser programs by a shared electronic network system.

23. The system according to claim 1, wherein the 4D portal information represents a physical object.

24. The system according to claim 1, wherein the 4D portal information is an abstract dataset which is represented by geometric shapes.

25. The system according to claim 1, wherein the 4D portal information is organized in a spatial hierarchy.

26. The system according to claim 1, wherein the 4D browser program is connected between the one or more 4D portal windows by a shared electronic network system.

27. The system according to claim 1, wherein the 4D browser program is further adapted to provide an interactive time control which specifies a starting time value and an ending time value for the fourth time dimension by moving the time control forward or backward in selectable time increments, process the 4D portal information corresponding to the time increment between the starting time value and the ending time value so as to maintain a temporal context of the one or more 4D objects in the 3D scene, and utilize the temporal context to determine the one or more spatial manifestations to be applied to the one or more 4D objects in the 3D scene between the starting time value and the ending time value.

28. The system according to claim 1, wherein the 4D browser program is further adapted to modify the 4D portal information and save the modifications on the one or more 4D portal storage mediums.

29. The system according to claim 1, further comprising:
a local storage medium, and wherein the 4D browser program is further adapted to modify the 4D portal information and save the modifications on the local storage medium.

30. The system according to claim 1, wherein the 4D browser program is further adapted to enable the selection of a temporal and spatial manifestation of a 4D object in the 3D scene with a pointing device.

31. The system according to claim 1, wherein the 4D browser program is further adapted to save the 3D scene each time the 3D scene is rendered in the 4D portal window as 4D objects are manipulated temporally or spatially.

32. A method for generating a temporally and spatially manipulatable 4D portal from one or more information databases, comprising:
identifying a representative set of 4D object types from the one or more information databases;
defining spatial manifestations for each 4D object type;
organizing the 4D object types and spatial manifestations into a set of 4D object definitions;
creating a 3D visual model for each 4D object type;
creating one or more 4D objects in a 3D scene based on the 4D object definitions; and
rendering and manipulating at least one of a temporal and spatial manifestation of the one or more 4D objects independent of the 3D scene.

33. The method according to claim 32, further comprising:
organizing the 4D object types into a 4D object spatial hierarchy.

34. The method according to claim 33, further comprising:
identifying 4D object attributes from the one or more information databases; and
identifying 4D object actions from the one or more information databases, wherein the spatial manifestations are defined for the 4D object attributes and the 4D object actions, and wherein the set of 4D object definitions are organized according to the 4D object types, the 4D object spatial hierarchy, the 4D object attributes, the 4D object actions and the spatial manifestations.

35. The method according to claim 34, further comprising creating guideway definitions based on the spatial manifestations.

36. The method according to claim 35, further comprising:
generating a 4D object audit trail from the one or more information databases.

37. The method according to claim 36, further comprising:
organizing the 4D object definitions, the 4D object audit trail, the 3D visual models and the guideway definitions into a 4D portal database.

38. The method according to claim 37, further comprising:
updating the one or more information databases from which the 4D portal information was derived; and
updating the 4D portal database in response to updates to the one or more information databases from which the 4D portal information was derived.

39. The method according to claim 38, wherein the 4D portal database is generated by a database management system.

* * * * *